(12) United States Patent
Dendel

(10) Patent No.: US 7,975,854 B2
(45) Date of Patent: Jul. 12, 2011

(54) ROTARY FAN PRESS

(75) Inventor: Joseph Dendel, Allegan, MI (US)

(73) Assignee: Prime Solution, Inc., Allegan, MI (US)

( * ) Notice: Subject to any disclaimer, the term of this patent is extended or adjusted under 35 U.S.C. 154(b) by 64 days.

(21) Appl. No.: 12/091,184

(22) PCT Filed: Oct. 28, 2005

(86) PCT No.: PCT/US2005/039073
§ 371 (c)(1),
(2), (4) Date: Apr. 23, 2008

(87) PCT Pub. No.: WO2007/050082
PCT Pub. Date: May 3, 2007

(65) Prior Publication Data
US 2008/0223773 A1    Sep. 18, 2008

(51) Int. Cl.
*B01D 33/15* (2006.01)
(52) U.S. Cl. .............. 210/359; 210/380.3; 210/393; 210/396; 100/223; 425/199
(58) Field of Classification Search .............. 210/359, 210/380.3, 391, 393, 396; 100/223; 425/197, 425/198, 199
See application file for complete search history.

(56) References Cited

U.S. PATENT DOCUMENTS

| | | | |
|---|---|---|---|
| 1,018,267 A | 2/1912 | Rach | |
| 1,610,431 A | 12/1926 | D'Olier | |
| 1,631,585 A | 6/1927 | D'Oiler et al. | |
| 1,717,313 A | 6/1929 | D'Olier | |
| 2,003,664 A | 6/1935 | Govers | |
| 2,045,740 A | 6/1936 | Wilson et al. | |
| 2,084,229 A | 6/1937 | Van Maanen | |
| 2,103,483 A | 12/1937 | McNeal | |

(Continued)

FOREIGN PATENT DOCUMENTS
EP    0307700    3/1989
(Continued)

OTHER PUBLICATIONS
Office Action mailed Jun. 26, 2008 in U.S. Appl. No. 11/573,402.
(Continued)

*Primary Examiner* — Fred Prince
(74) *Attorney, Agent, or Firm* — Price, Heneveld, Cooper, DeWitt & Litton, LLP

(57) ABSTRACT

A system (10) for extracting liquid from a mass comprising a portable platform (12) having an upper surface (14), a system mass input (16), a polymer feeding and blending system (18) on the upper surface (14), a liquid extraction assembly (40) on the upper surface (14), and piping (22) having a first section (24) between the system mass input (16) and the polymer feeding and blending system (18), and a second section (26) between the polymer feeding and blending system (18) and the liquid extraction assembly (40). The system is configured to have mass inputted into the system mass input (16), transport the mass to the polymer feeding and blending system (18) through the first section (24) of the piping, inject polymer into the mass in the polymer feeding and blending system (18), and transport the mass from the polymer feeding and blending system (18) to the liquid extraction assembly (40). Pressure from the mass forced into the liquid extraction assembly (18) forces liquid in the mass to exit the mass.

41 Claims, 12 Drawing Sheets

U.S. PATENT DOCUMENTS

| | | | |
|---|---|---|---|
| 2,127,270 A | 8/1938 | Schaaf | |
| 2,146,158 A | 2/1939 | Scherer | |
| 2,149,017 A | 2/1939 | Gordon | |
| 2,354,752 A | 8/1944 | Hellan | |
| 2,419,155 A | 4/1947 | Orton, Jr. | |
| 2,545,144 A | 3/1951 | Green et al. | |
| 2,793,583 A | 5/1957 | Messing | |
| 3,053,171 A | 9/1962 | Asplund | |
| 3,277,814 A | 10/1966 | Malm et al. | |
| 3,288,293 A | 11/1966 | Essel | |
| 3,741,388 A | 6/1973 | Takahashi | |
| 3,769,904 A | 11/1973 | Yoritomi | |
| 3,774,528 A | 11/1973 | Reinhall | |
| 3,882,025 A | 5/1975 | Talley, Jr. | |
| 3,989,629 A | 11/1976 | Donovan | |
| 4,099,458 A | 7/1978 | Seifert | |
| 4,111,115 A | 9/1978 | Cory | |
| 4,139,467 A | 2/1979 | Fritzvold et al. | |
| 4,268,381 A * | 5/1981 | Hooper | 209/273 |
| 4,534,868 A | 8/1985 | Barbulescu et al. | |
| 4,565,602 A | 1/1986 | Haartti et al. | |
| 4,580,961 A | 4/1986 | Jensen | |
| 4,728,424 A | 3/1988 | Miura | |
| 4,986,881 A | 1/1991 | Funk | |
| 5,045,046 A | 9/1991 | Bond | |
| 5,053,123 A | 10/1991 | Clarke-Pounder et al. | |
| 5,087,358 A | 2/1992 | Massignani | |
| 5,176,261 A * | 1/1993 | Holz | 209/273 |
| 5,205,941 A | 4/1993 | Funk et al. | |
| 5,213,686 A | 5/1993 | Funk et al. | |
| 5,344,575 A | 9/1994 | Boulet et al. | |
| 5,354,256 A | 10/1994 | Knelson | |
| 5,417,856 A * | 5/1995 | Bacher et al. | 210/333.1 |
| 5,456,828 A * | 10/1995 | Tersi et al. | 210/184 |
| 5,566,611 A | 10/1996 | Scheucher et al. | |
| 5,577,674 A | 11/1996 | Altonji et al. | |
| 5,582,724 A | 12/1996 | Rogers et al. | |
| 5,582,726 A | 12/1996 | Feller et al. | |
| 5,618,423 A | 4/1997 | Lin | |
| 5,709,801 A | 1/1998 | Murofushi et al. | |
| 5,885,461 A | 3/1999 | Tetrault et al. | |
| 6,004,468 A | 12/1999 | Barbulescu et al. | |
| 6,042,735 A | 3/2000 | Gommel et al. | |
| 6,165,323 A | 12/2000 | Shearer | |
| 6,206,204 B1 | 3/2001 | Aikawa | |
| 6,241,890 B1 | 6/2001 | Clay et al. | |
| 6,284,145 B1 | 9/2001 | Andersson | |
| 6,344,112 B1 | 2/2002 | Hernesniemi | |
| 6,346,069 B1 | 2/2002 | Collier | |
| 6,461,507 B1 | 10/2002 | Ishigaki et al. | |
| 6,615,710 B1 | 9/2003 | Ishigaki et al. | |
| 7,166,229 B2 | 1/2007 | Cote et al. | |
| 2005/0000917 A1 | 1/2005 | Cote et al. | |
| 2005/0029183 A1 * | 2/2005 | Sternad et al. | 210/331 |
| 2007/0256984 A1 | 11/2007 | Benesi et al. | |

FOREIGN PATENT DOCUMENTS

| | | |
|---|---|---|
| EP | 0761692 | 3/1997 |
| EP | 0931578 | 7/1999 |
| JP | 57019197 | 2/1982 |
| JP | 2001058107 | 3/2001 |
| JP | 2001113109 | 4/2001 |
| JP | 2001129316 | 5/2001 |
| JP | 2001129318 | 5/2001 |
| JP | 2002210308 | 7/2002 |
| JP | 2004074066 | 3/2004 |
| JP | 2004209438 | 7/2004 |
| JP | 2004291036 | 10/2004 |
| WO | 9416879 | 8/1994 |
| WO | 0126776 | 4/2001 |
| WO | 03004130 | 1/2003 |
| WO | 2006020543 | 2/2006 |
| WO | 2005077848 | 11/2007 |

OTHER PUBLICATIONS

Response filed Sep. 26, 2008 in U.S. Appl. No. 11/573,402.
Office Action mailed Dec. 30, 2008 in U.S. Appl. No. 11/573,402.
Amendment filed Jun. 12, 2009 in U.S. Appl. No. 11/573,402.
Appeal Brief filed Jun. 25, 2009 in U.S. Appl. No. 11/573,402.
Amendment filed Jun. 25, 2009 in U.S. Appl. No. 11/573,402.
Notice of Allowance mailed Oct. 9, 2009 in U.S. Appl. No. 11/573,402.
Amendment filed Nov. 23, 2009 in U.S. Appl. No. 11/573,402.
Petition and Rce filed Jan. 7, 2010 in U.S. Appl. No. 11/573,402.
Office Action mailed Apr. 29, 2010 in U.S. Appl. No. 11/573,402.
Response filed Jun. 10, 2010 in U.S. Appl. No. 11/573,402.
Notice of Allowance mailed Jul. 1, 2010 in U.S. Appl. No. 11/573,402.
Office Action mailed May 21, 2010 in U.S. Appl. No. 12/581,509.
Response filed Aug. 20, 2010 in U.S. Appl. No. 12/581,509.
Office Action mailed Jun. 3, 2010 in U.S. Appl. No. 11/554,279.

* cited by examiner

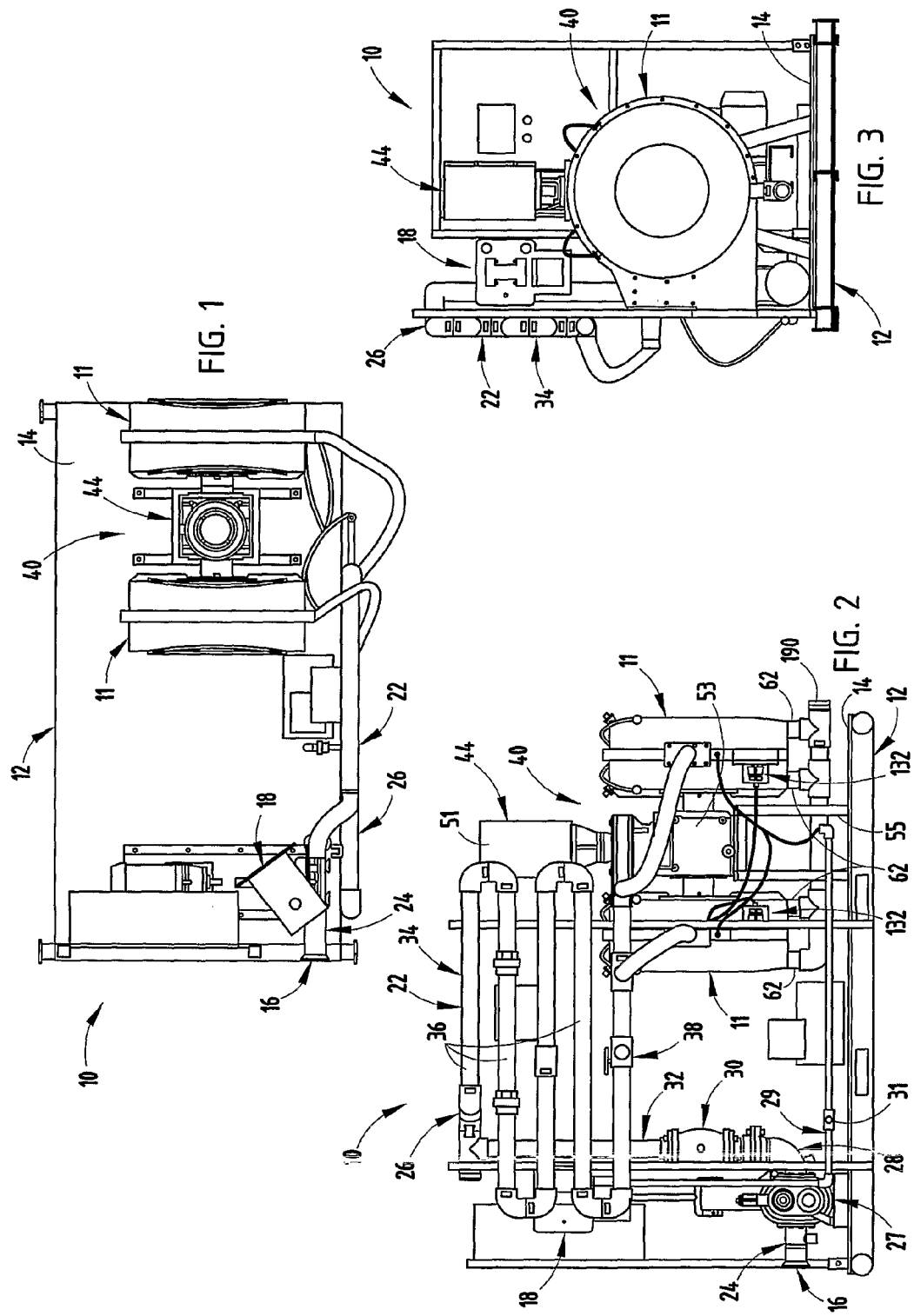

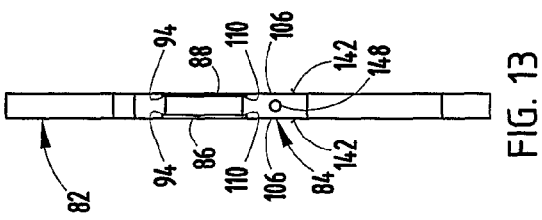
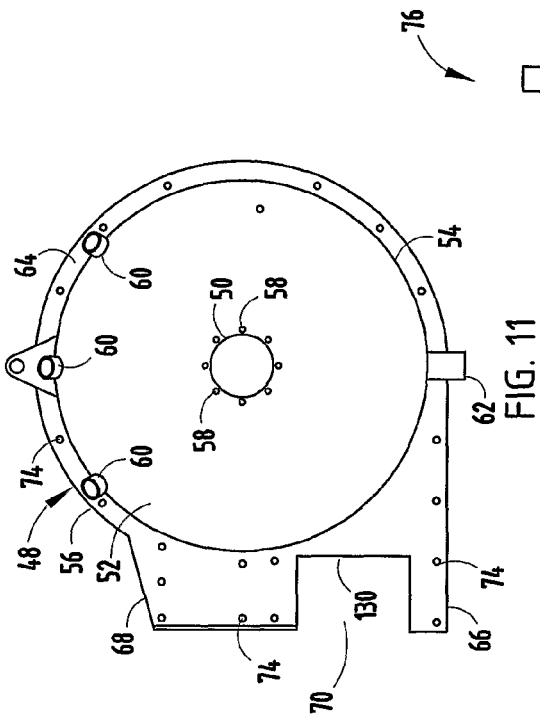
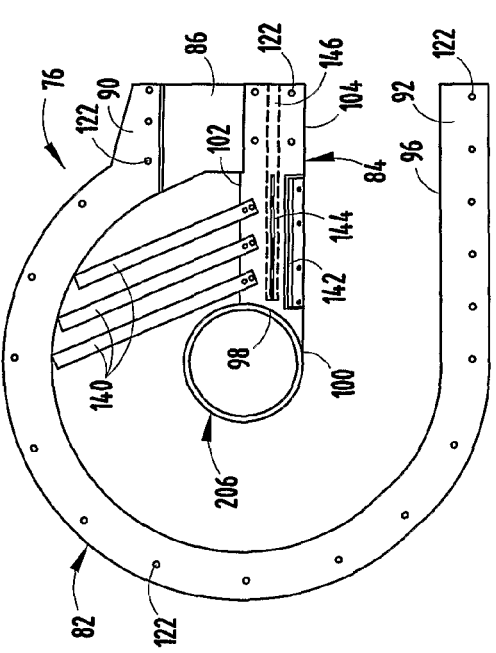
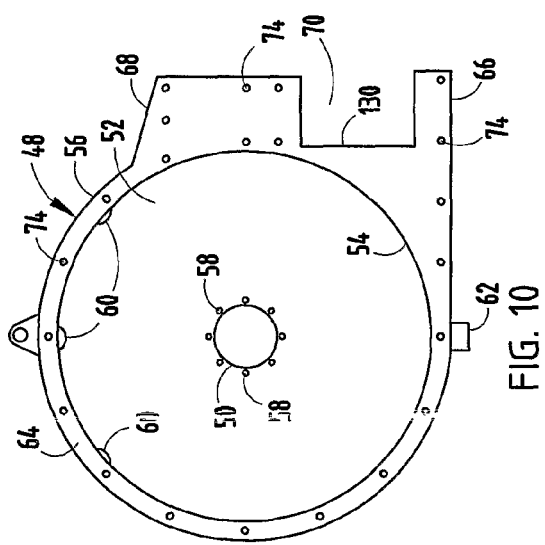

ROTARY FAN PRESS

FIELD OF THE INVENTION

The present invention concerns a liquid extraction machine, and more particularly relates to liquid extraction machines having a rotary fan press.

BACKGROUND OF THE INVENTION

Apparatus for feeding, compressing, liquid extraction, washing and chemical treatment of sludge, slurries or other wet materials are well known. Such equipment finds particular application in the pulp and paper industry, waste water treatment, mineral processing, agriculture, food processing, fisheries, breweries, wineries, chemical processing, oil and tar sands industry, etc.

An improved apparatus is desired for feeding, compressing, liquid extracting, washing and chemical treating of the sludge, slurries or other wet materials.

SUMMARY OF THE PRESENT INVENTION

An aspect of the present invention is to provide a liquid extraction assembly for extracting liquid from a mass comprising a housing having an inlet and an outlet. The housing further includes a path between the inlet and the outlet. The housing is configured to have the mass forced into the inlet to move the mass from the inlet to the outlet. The housing includes at least one rotating screen adjacent the path and defining one wall of the path. The at least one rotating screen includes a plurality of openings therethrough. The inlet of the housing tapers outwardly towards a rear of the inlet such that a beginning of the inlet is smaller than an end of the inlet. Pressure from the mass forced into the input presses the mass against the at least one rotating screen to thereby force at least a portion of liquid in the mass to pass through the openings of the at least one rotating screen.

Another aspect of the present invention is to provide a liquid extraction assembly for extracting liquid from a mass comprising a pair of housings, with each having an inlet and an outlet. The housings each further include a path between the inlet and the outlet. The housings are configured to have the mass forced into the inlet to move the mass from the inlet to the outlet. The housings each include at least one rotating screen adjacent the path and defining one wall of the path. The rotating screens includes a plurality of openings therethrough. The inlet of each housing tapers outwardly towards a rear of the inlet such that a beginning of the inlet is smaller than an end of the inlet. A single motor positioned between the pair of housings for driving both of the rotating screens. Pressure from the mass forced into the inputs presses the mass against the rotating screens to thereby force at least a portion of liquid in the mass to pass through the openings of the rotating screens.

A further aspect of the present invention is to provide a system for extracting liquid from a mass comprising a portable platform having an upper surface, a system mass input, a polymer feeding and blending system on the upper surface, and a liquid extraction assembly on the upper surface, with the liquid extraction assembly including an inlet and an outlet. The system further includes piping having a first section between the system mass input and the polymer feeding and blending system, and a second section between the polymer feeding and blending system and the liquid extraction assembly. The system is configured to have mass inputted into the system mass input, transport the mass to the polymer feeding and blending system through the first section of the piping, inject polymer into the mass in the polymer feeding and blending system, transport the mass from the polymer feeding and blending system to the inlet of the liquid extraction assembly. Pressure from mass forced into the liquid extraction assembly forces at least a portion of liquid in the mass to exit the mass, whereby the mass with the portion of liquid removed therefrom is exited out of the outlet of the liquid extraction assembly. The inlet to the liquid extraction assembly is located below the outlet of the liquid extraction assembly.

Another aspect of the present invention is to provide a liquid extraction assembly for extracting liquid from a mass comprising a housing having an inlet and an outlet, and a support supporting the housing and located below the housing. The housing further includes a path between the inlet and the outlet. The housing is configured to have the mass forced into the inlet to move the mass from the inlet to the outlet. The housing includes at least one rotating screen adjacent the path and defining one wall of the path. The at least one rotating screen includes a plurality of openings therethrough. Pressure from the mass forced into the input presses the mass against the at least one rotating screen to thereby force at least a portion of liquid in the mass to pass through the openings of the at least one rotating screen. The inlet to the liquid extraction assembly is located below the outlet of the liquid extraction assembly.

These and other aspects, objects, and features of the present invention will be understood and appreciated by those skilled in the art upon studying the following specification, claims, and appended drawings.

BRIEF DESCRIPTION OF DRAWINGS

FIG. 1 is a top view of a system for extracting liquid from a mass of the present invention.

FIG. 2 is a front view of the system for extracting liquid from a mass of the present invention.

FIG. 3 is a side view of the system for extracting liquid from a mass of the present invention.

FIG. 10 is a first side view of the inner housing shell of the housing of the liquid extraction assembly of the present invention.

FIG. 11 is a second side view of the inner housing shell of the housing of the liquid extraction assembly of the present invention.

FIG. 12 is a side view of a center seal of the liquid extraction assembly of the present invention.

FIG. 13 is a front view of the center seal of the liquid extraction assembly of the present invention.

DETAILED DESCRIPTION OF PREFERRED EMBODIMENTS

Figure 4:
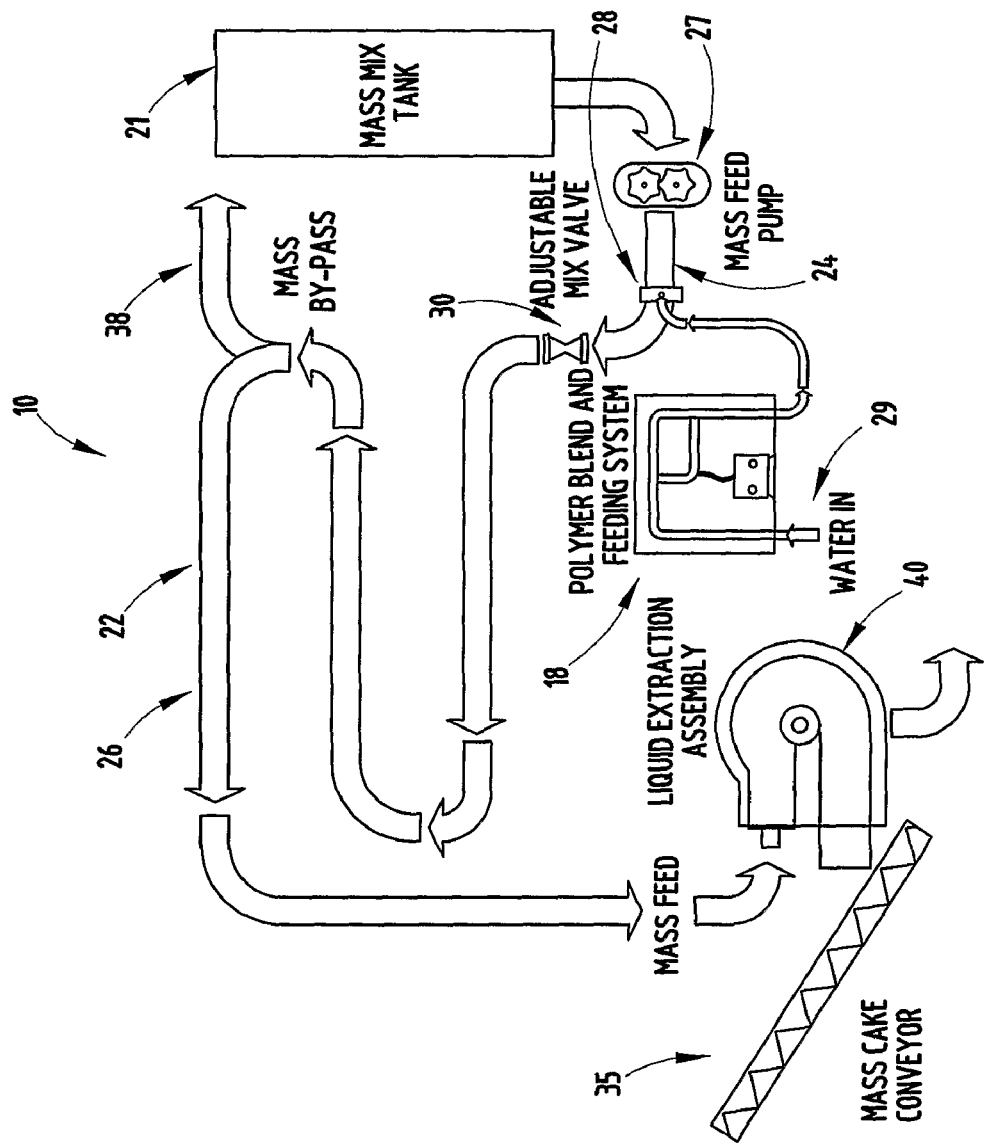
FIG. 4 is a schematic of the system for extracting liquid from a mass of the present invention.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention relates to an apparatus and method for extracting liquid from a humid mass (e.g., sludges and slurries), as those used or produced in the pulp and paper industry, waste water treatment plants, agricultural, food and beverage industries, etc. The apparatus and method according to the present invention operate on the same basic extraction principle as the system and method described in U.S. Pat. No. 4,534,868, the disclosure of which is hereby incorporated herein by reference. The present invention is used to remove a portion of liquid from the humid mass to produce a waste solid that is easy to dispose.

The reference number 10 (FIGS. 1-4) generally designates a system for extracting liquid from a mass. The illustrated system 10 for extracting liquid from a mass comprises a platform 12 having an upper surface 14, a system mass input 16, a polymer feeding and blending system 18 on the upper surface 14, a liquid extraction assembly 40 on the upper surface 14, and piping 22 having a first section 24 between the system mass input 16 and the polymer feeding and blending system 18, and a second section 26 between the polymer feeding and blending system 18 and the liquid extraction assembly 40. The system 10 is configured to have mass inputted into the system mass input 16, transport the mass to the polymer feeding and blending system 18 through the first section 24 of the piping 22, inject polymer into the mass in the polymer feeding and blending system 18, and transport the mass from the polymer feeding and blending system 18 to the liquid extraction assembly 40. Pressure from mass forced into the liquid extraction assembly 40 forces liquid in the mass to exit the mass. In the illustrated embodiment, the liquid extraction assembly 40 comprises a pair of liquid extraction presses 11. However, it is contemplated that the liquid extraction assembly 40 of the present invention could use any number (including only one) of the liquid extraction presses 11 as described in more detail below.

In the illustrated embodiment, the system 10 can either include a source of mass (as shown schematically in FIG. 4) or be configured to be connected to a source of mass (as illustrated in FIG. 1). The mass is preferably a humid mass (e.g., sludges and slurries). As stated above, the mass can be that used or produced in the pulp and paper industry, waste water treatment plants, agricultural industries, food and beverages industries, etc. The system 10 of the present invention removes at least a portion of the liquid in the mass. In the illustrated embodiment, the system 10 is portable and can be directly brought to the pulp and paper industry, waste water treatment plants, agricultural industry, food and beverages industries, etc. for use at those locations. The system mass input 16 is configured to be connected to a hose that transports the mass to the system 10 from the source of mass. Preferably, the system 10 is located on the platform 12 that has an upper surface 14 smaller than 72 square feet to provide a compact and easily movable system. However, several of the inventive features disclosed herein can be used in a stationary and fixed system. In a stationary and fixed system, the source of mass can comprise a tank 21 (see FIG. 4) having the mass therein, with the tank 21 communicating with the system mass input 16.

The illustrated system 10 preferably includes a mass feed pump 27 for assisting in drawing the mass from the source of mass through the hose or from the tank 21. The mass feed pump 27 also provides pressure to the mass to assist in moving the mass through the piping 22 and into and through the liquid extraction assembly 40. Mass feed pumps 27 are well known to those skilled in the art. After passing through the mass feed pump 27, the mass is fed into the polymer feeding and blending system 18. The polymer feeding and blending system 18 is configured to be connected to a water supply 29 for mixing water with polymer in the polymer feeding and blending system 18. In the illustrated example, the system 10 includes a fitting 31 for connecting to a water supply for supplying the polymer feeding and blending system 18 with the water. The polymer feeding and blending system 18 includes an injection area 28 connected to the first section 24 and the second section 26 of the piping 22 and defines a transition from the first section 24 to the second section 26. After the water is mixed with the polymer, a combination of the water and polymer is injected into the injection area 28 for mixing with the mass from the first section 24 before the mass is moved to the second section 26 of the piping 22. The polymer feeding and blending system 18 and the polymer used therein are well known to those skilled in the art. The polymer is preferably a conventional known polymer flocculent, such as a polyacrylamide. However, it is contemplated that the system 10 could be used without an added polymer and without the polymer feeding and blending system 18. For example, a mass such as grinding swarf could be deliquidified using the system 10 without a polymer.

In the illustrated example, once the mass is moved to the second section 26 of the piping 22, the mass is thoroughly mixed with the combination of polymer and water in an adjustable mix valve 30 in the second section 26 of the piping 22. The second section 26 of piping 22 preferably includes a first portion 32 extending vertically upwards from the mix valve 30 to a top of the second section 26 of the piping 22. The second section 26 of the piping 22 also includes a second portion 34 comprising a plurality of horizontal rows 36 of pipes, with each row 36 connected at one end to the row 36 above and at another end at the row 36 below. The second portion 34 of the second section 26 of the piping 22 is connected to the liquid extraction assembly 40, wherein the mass is fed into the liquid extraction assembly 40. In the illustrated embodiment, the second section 26 of the piping 22 includes a mass bypass tube 38 having a selectively opening valve for allowing the mass in the second section 26 of the piping 22 to bypass the liquid extraction assembly 40. It is contemplated that the mass taken out of the second section 26 of the piping 22 could be reinserted into the system 10 by placing the mass taken out of the second section 26 into the source of mass or directly or indirectly into the system mass input 16. Likewise, the second section 26 of the piping 22 can include an extraction valve for each liquid extraction press 11 of the liquid extraction assembly 40 for selectively allowing the mass in the second section 26 to be fed into one or more of the liquid extraction presses 11. FIG. 4 illustrates a schematic representation of the system 10. As shown schematically in FIG. 4, the system 10 can include at least one conveyor 35 for accepting the solid portion of the mass exiting one or more of the liquid extraction assemblies 40 to move the mass to a disposal or collecting device (not shown).

In the illustrated example, the liquid extraction assembly 40 accepts the mass from the piping 22 and outputs a solid and the at least a portion of the liquid. The liquid extraction assembly 40 of the present invention includes a pair of liquid extraction presses 11 connected to a motor assembly 44. In the illustrated example, the system 10 of the present invention comprises a pair of liquid extraction presses 11 that share the motor assembly 44. However, it is contemplated that only one liquid extraction press 11 could be used or that each liquid extraction press 11 could have its own motor assembly 44. Furthermore, the system 10 can include any number of liquid extraction presses 11.

Figure 5:
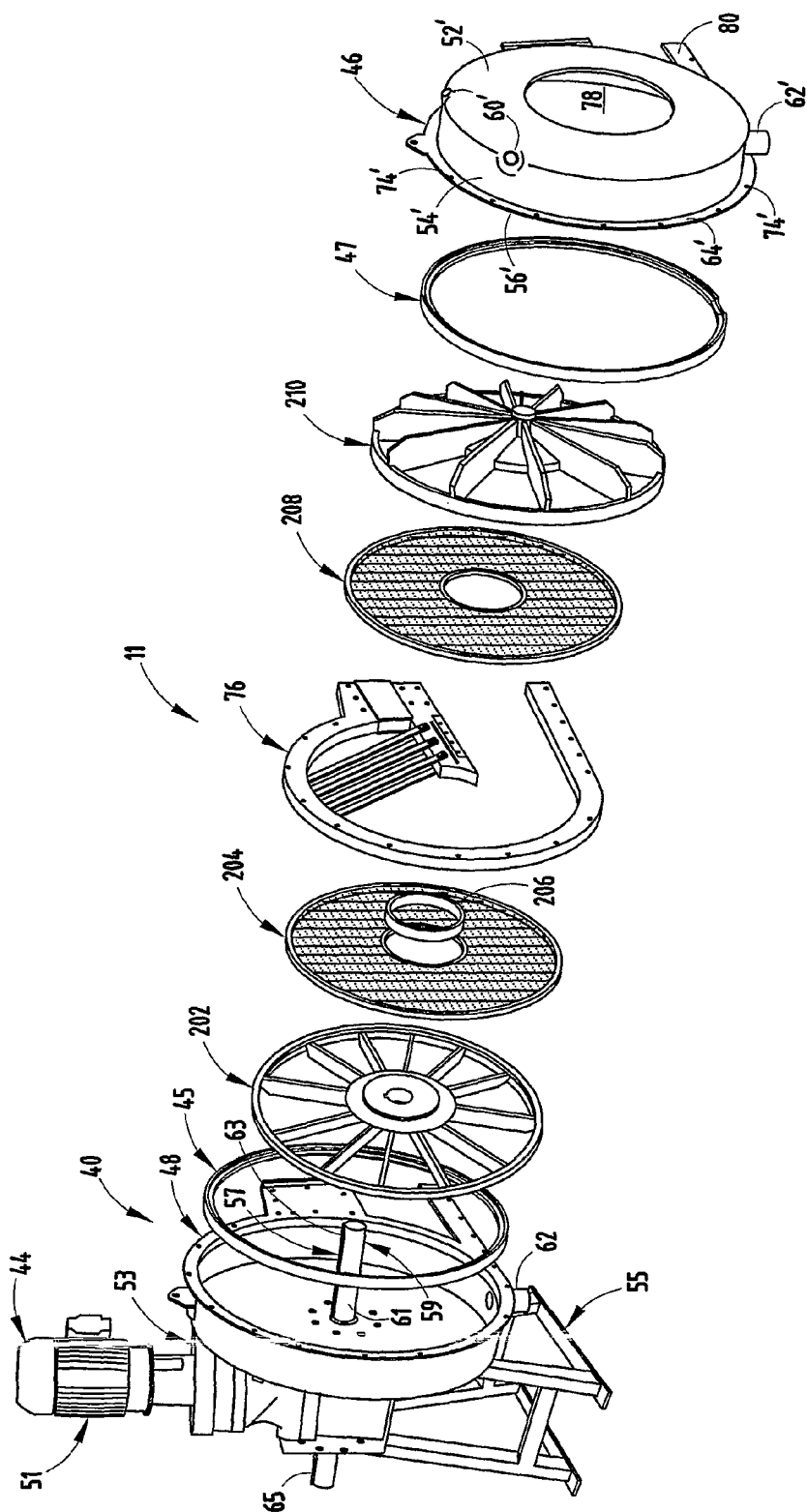
FIG. 5 is an exploded rear perspective view of a liquid extraction assembly and a motor assembly of the system of the present invention.

The illustrated motor assembly 44 powers the liquid extraction presses 11. The motor assembly 44 includes an upright motor 51, a transfer housing 53 and a support 55. The support 55 extends upwardly from the platform 12 between the liquid extraction presses 11. The upright motor 51 includes a vertical rotary output shaft (not shown) that extends into the transfer housing 53. The transfer housing 53 transmits the rotary motion of the vertical rotary output shaft of the upright motor 51 to a horizontal motor assembly output shaft 57 (see FIG. 6A) in a manner well known to those skilled in the art (e.g., a worm gear or any other means). The motor assembly output shaft 57 includes a first end 65 that extends into a first one of the liquid extraction presses 11 and a second end 59 that extends into a second one of the liquid extraction presses 11. As illustrated in FIGS. 5 and 6A, the first end 65 and the second end 59 of the motor assembly output shaft 57 each include a cylindrical portion 61 and a key flange 63 extending along a longitudinal surface of the cylindrical portion 61. The first end 65 and the second end 59 of the motor assembly output shaft 57 power the liquid extraction presses 11 as described in more detail below.

Figure 6:
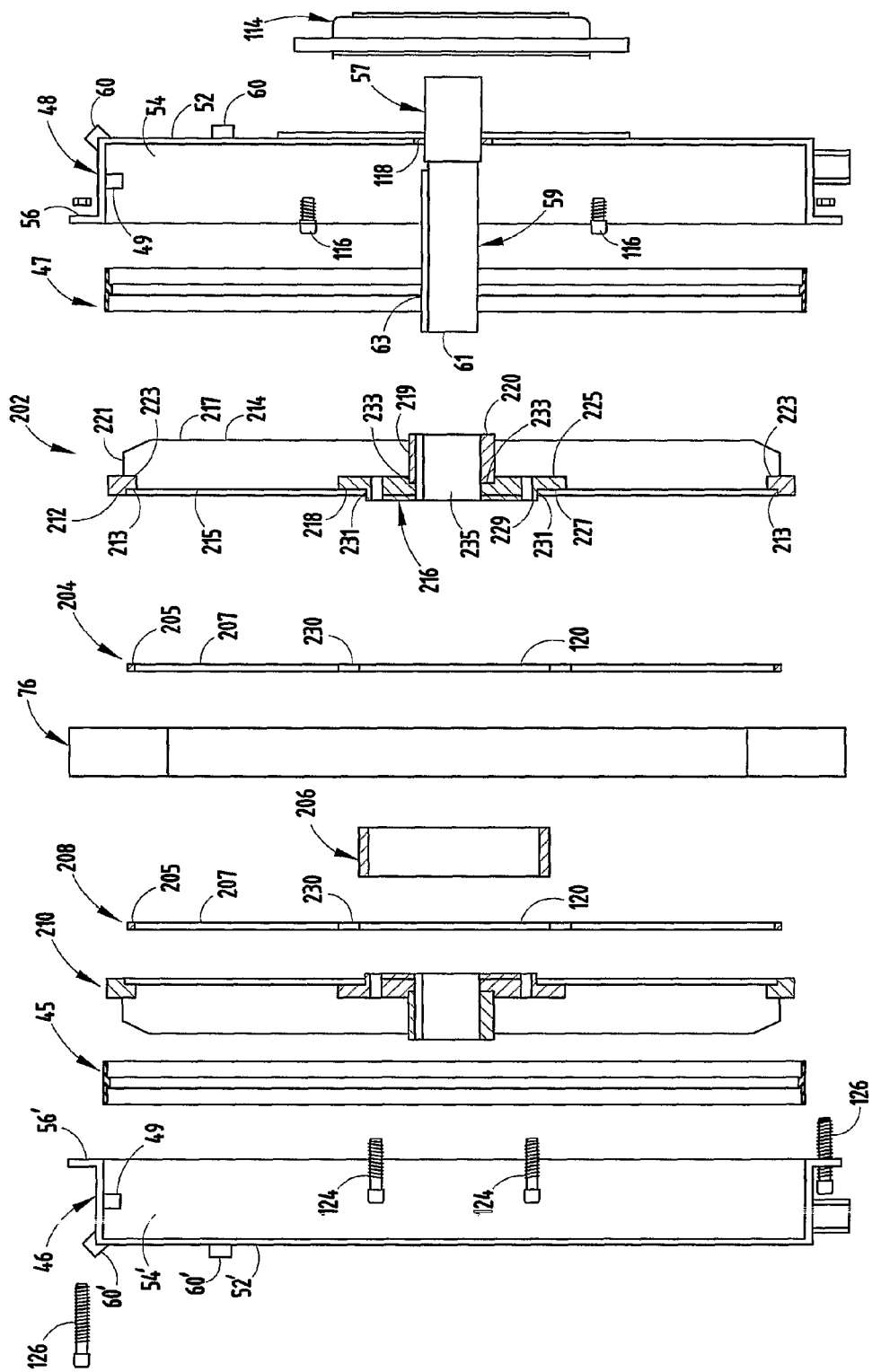
FIG. 6 is an exploded cross-sectional view of the liquid extraction assembly of the present invention.
Figure 6A:
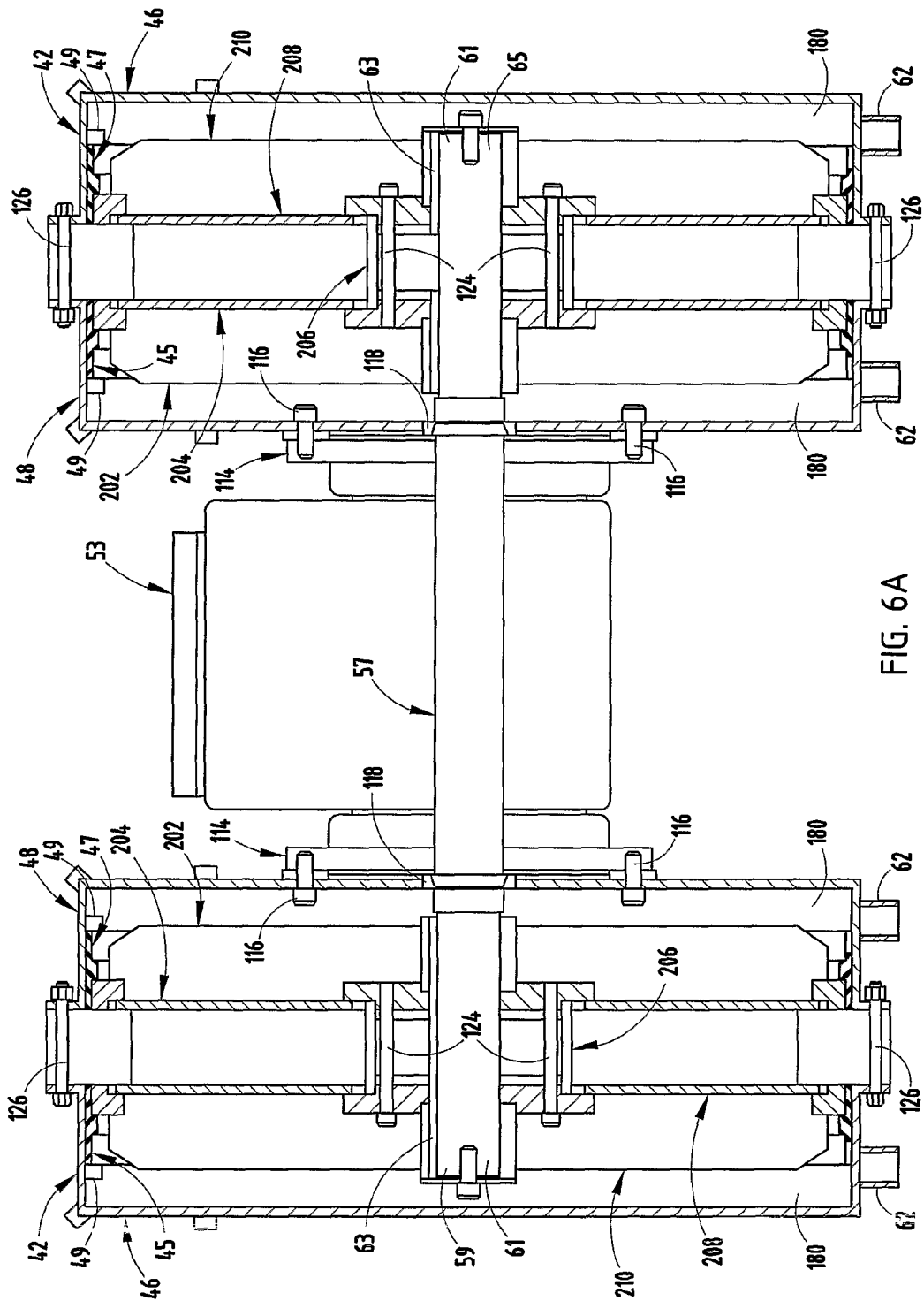
FIG. 6A is a cross-sectional view of a pair of liquid extraction assemblies and a transfer housing of a motor assembly of the system of the present invention.

As illustrated in FIGS. 5, 6 and 6A, each liquid extraction press 11 comprises a housing 42 including an outer housing shell 46 and an inner housing shell 48. The inner housing shell 48 (FIGS. 5, 6 and 8-11) includes a circular base wall 52, a tubular wall 54 extending from the base wall 52 and a peripheral flange 56 extending from the tubular wall 54 opposite the base wall 52. The circular base wall 52 includes a drive shaft opening 50 centrally located therein and a plurality of fastener openings 58 surrounding the drive shaft opening 50. The fastener openings 58 are configured to accept fasteners therein to connect the inner housing shell 48 to the motor assembly 44. The edge between the base wall 52 and the tubular wall 54 includes three sanitary holes 60 for allowing a cleaning fluid to be injected into the inner housing shell 48 when the liquid extraction assembly 40 is constructed to clean the liquid extraction assembly 40 as discussed below. Although three sanitary holes 60 are shown, any number of sanitary holes 60 could be employed. The sanitary holes 60 can be plugged during normal use of the liquid extraction assembly 40 or opened to allow water or other cleaning fluid to be injected into the liquid extraction assembly 40 to clean the liquid extraction assembly 40. It is contemplated that the sanitary holes 60 could have a threaded outer surface for connection to a common garden hose. The tubular wall 54 further includes a filtrate drain 62 located at a bottom of the tubular wall 54. The filtrate drain 62 allows the liquid extracted from the mass and any cleaning fluid injected into the liquid extraction assembly 40 to exit the liquid extraction assembly 40. The peripheral flange 56 of the inner housing shell 48 includes a circular portion 64, a bottom extending lip portion 66 and a nose portion 68. The bottom extending lip portion 66 and the nose portion 68 define an open mouth 70. As explained in more detail below, the open mouth 70 is configured to have a movable side wall 72 (see FIGS. 19 and 19A) inserted therein. The circular portion 64, the bottom extending lip portion 66 and the nose portion 68 all include a plurality of connection openings 74 for connecting a center seal 76 (described below) and the outer housing shell 46 to the inner housing shell 48. The inner housing shell 48 and the outer housing shell 46 are substantially a mirror image of each other (except that the outer housing shell 46 does not include the drive shaft opening 50, the mouth 70 and other details noted below).

In the illustrated example, the outer housing shell 46 includes a circular base wall 52', a tubular wall 54' extending from the base wall 52' and a peripheral flange 56' extending from the tubular wall 54' opposite the base wall 52'. The circular base wall 52' can include a window 78 centrally located therein for viewing an interior of the liquid extraction assembly 40. The edge between the base wall 52' and the tubular wall 54' includes three sanitary holes 60' for allowing a cleaning fluid to be injected into the inner housing shell 48 when the liquid extraction assembly 40 is constructed to clean the liquid extraction assembly 40 as discussed below. Although three sanitary holes 60' are shown, any number of sanitary holes 60' could be employed. The sanitary holes 60' can be plugged during normal use of the liquid extraction assembly 40 or opened to allow water or other cleaning fluid to be injected into the liquid extraction assembly 40 to clean the liquid extraction assembly 40. The tubular wall 54' further includes a filtrate drain 62' located at a bottom of the tubular wall 54'. The filtrate drain 62' allows the liquid extracted from the mass and any cleaning fluid injected into the liquid extraction assembly 40 to exit the liquid extraction assembly 40. The peripheral flange 56' of the inner housing shell 48' includes a circular portion 64' and an extension portion 80 extending from the circular portion 64'. The extension portion 80 has a peripheral shape substantially identical to the bottom extending lip portion 66, the nose portion 68 and the open mouth 70 of the inner housing shell 48. The circular portion 64' and the extension portion 80 include a plurality of connection openings 74' corresponding to the connection openings 74' of the inner housing shell 48 for connecting the center seal 76 (described below) and the inner housing shell 48 to the outer housing shell 46.

The illustrated center seal 76 (FIGS. 5, 6, 6A, 12 and 13) is positioned between the inner housing shell 48 and the outer housing shell 46 and defines an upper and lower boundary of the mass traveling through one of the liquid extraction presses 11 of the liquid extraction assembly 40. The center seal 76 also defines the inlet and the outlet for the sludge through the liquid extraction press 11. The center seal 76 includes an outer C-shaped portion 82, a scraper portion 84, a first inlet plate 86 and a second inlet plate 88. The outer C-shaped portion 82 includes an inlet extension 90 and an outlet extension 92. The inlet extension 90 includes a pair of grooves 94 configured to accept a top edge of the first inlet plate 86 and the second inlet plate 88. The outlet extension 92 of the outer C-shaped portion 82 includes an angled top surface 96. The scraper portion 84 is located between the outlet extension 92 and the inlet extension 90 of the outer C-shaped portion 82. The scraper portion 84 includes an inner annular face 98 having a scraping tip 100, a top face 102, a bottom face 104, a pair of side faces 106, and an end face 108 opposite to the inner annular face 98. A pair of upper grooves 110 in the pair of side faces 106 are configured to accept a bottom edge of the first inlet plate 86 and the second inlet plate 88. The bottom face 104 of the scraper portion 84 and the angled top surface 96 of the outlet extension 92 of the outer C-shaped portion 82 define a top and bottom surface for the outlet of the solid portion of the sludge that tapers outwardly. It is contemplated that at least one of the side wall 72 and the extension portion 80 could comprise a selectively actuatable constriction plate as discussed below. The outer C-shaped portion 82, the scraper portion 84, the first inlet plate 86 and the second inlet plate 88 each include connection openings 122 for connecting the center seal 76 to the inner housing shell 48 and the outer housing shell 46 as described below.

Figure 7:
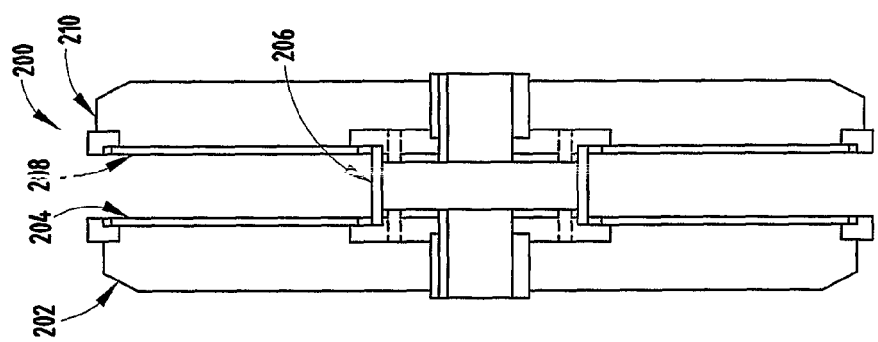
FIG. 7 is a cross-sectional view of a rotary screen assembly of the liquid extraction assembly of the present invention.
Figure 15:
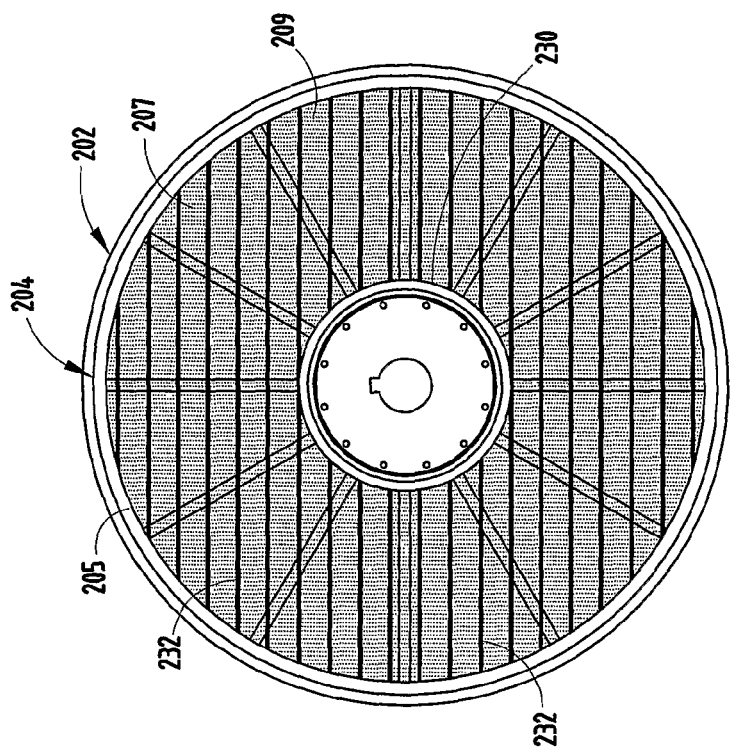
FIG. 15 is a second side view of a slotted filter screen and the drive wheel of the rotary screen assembly of the liquid extraction assembly of the present invention.

In the illustrated example, a rotary screen assembly 200 (FIG. 7) surrounds the center seal 76 and assists in removing the liquid portion from the sludge. The rotary screen assembly 200 includes a first side drive wheel 202, a first side slotted filter screen 204, a center hub/spacer 206, a second side slotted filter screen 208 and a second side drive wheel 210. The first side drive wheel 202 and the second side drive wheel 210 are preferably identical, but in an opposite orientation. Likewise, the first side slotted filter screen 204 and the second side slotted filter screen 208 are preferably identical, but in an opposite orientation.

The illustrated first side drive wheel 202 and the second side drive wheel 210 (FIGS. 5-7) each include an outer rim 212, a plurality of spokes 214 and an inner rim assembly 216. The outer rim 212 is substantially circular and includes an inner periphery notch 213. The plurality of spokes 214 each includes an inner edge 215, an outer edge 217, and inside end 219 and an outside end 221. An outer rim notch 223 is located at the intersection of the inner edge 215 and the outside end 221. The outer rim 212 is located in the outer rim notch 223. The spokes 214 also include an inner rim notch 225 located at the intersection of the inner edge 215 and the inside end 219. The inner rim assembly 216 comprises an inner annular plate 218 and a tubular drive shaft member 220. The inner annular plate 218 is located in the inner rim notch 225 of the spokes 214. The inner annular plate 218 includes a base portion 227 and a circular extension member 229 defining a center spacer/hub support notch 231 located outside of the circular extension member 229 and on a surface of the base portion 227 from which the circular extension member 229 extends. The base portion 227 of the inner annular plate 218 also includes a rear notch 233 having the tubular drive shaft member 220 therein. The inner annular plate 218 and the tubular drive shaft member 220 define a drive shaft opening 235 for accepting the first end 65 or the second end 59 of the motor assembly output shaft 57 therein. The key flange 63 of the first end 65 or the second end 59 of the motor assembly output shaft 57 is accepted into a drive shaft notch 237 of the drive shaft opening 235 to ensure that the tubular drive shaft member 220 and the inner annular plate 218 rotate with the motor assembly output shaft 57.

Figure 16:
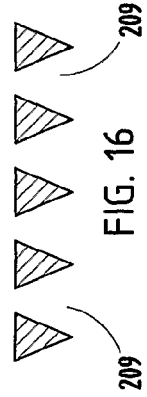
FIG. 16 is a cross-sectional view of the slotted filter screen of the present invention.
Figure 14:
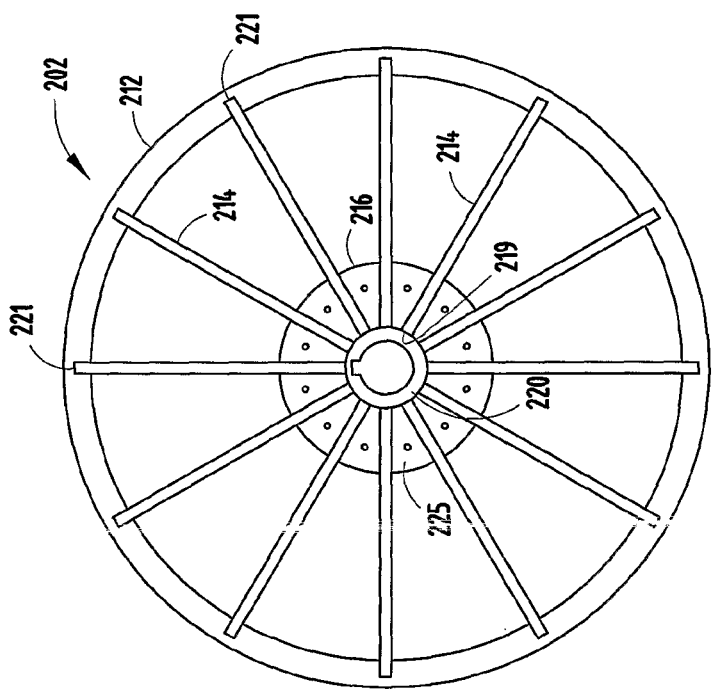
FIG. 14 is a first side view of a drive wheel of the rotary screen assembly of the liquid extraction assembly of the present invention.

In the illustrated example, the first side slotted filter screen 204 and the second side slotted filter screen 208 (FIGS. 5-6A, 15 and 16) each include an outer rim 205, a face 207 having a plurality of slots 209 and an inner hub 230. It is contemplated that the slotted filter screens could be made by connecting a plurality of wires to the outer rim 205 and the inner hub 230, thereby defining the slots 209. Alternatively, it is contemplated that the slotted filter screens 204 and 208 could be made by etching (for example, using water or another liquid) slots into an annular plate, thereby forming the outer rim 205, the face 207 having the plurality of slots 209 and the inner hub 230. The slotted filter screens 204 and 208 can also include a plurality of support bars 232 extending between the outer rim 205 and the inner hub 230 for supporting a rear side of the face 207 having the plurality of slots 209 therein. The slots 209 allow for a high filtration area over the slotted filter screens 204 and 208 compared to a perforated plate of the prior art, thereby providing a higher solid capture rate and easier cleaning. The spokes 214 of the first side drive wheel 202 and the second side drive wheel 210 abut against the support bars 232 of the slotted filter screens 204 and 208. It is contemplated that the slotted filter screens 204 and 208 could have any diameter, including 24 and 36 inches. The slots 209 preferably extend from a first point on the circumference of the slotted filter screens 204, 208 to a second point on the circumference of the slotted filter screens 204, 208 (with a possible interruption if the slots cross the center of the slotted filter screens 204, 208). As illustrated in FIG. 16, the slots 209 preferably have a triangular shape, with the larger end of the slots 209 abutting against the mass as the mass moves through the liquid extraction assembly 40.

Figure 9:
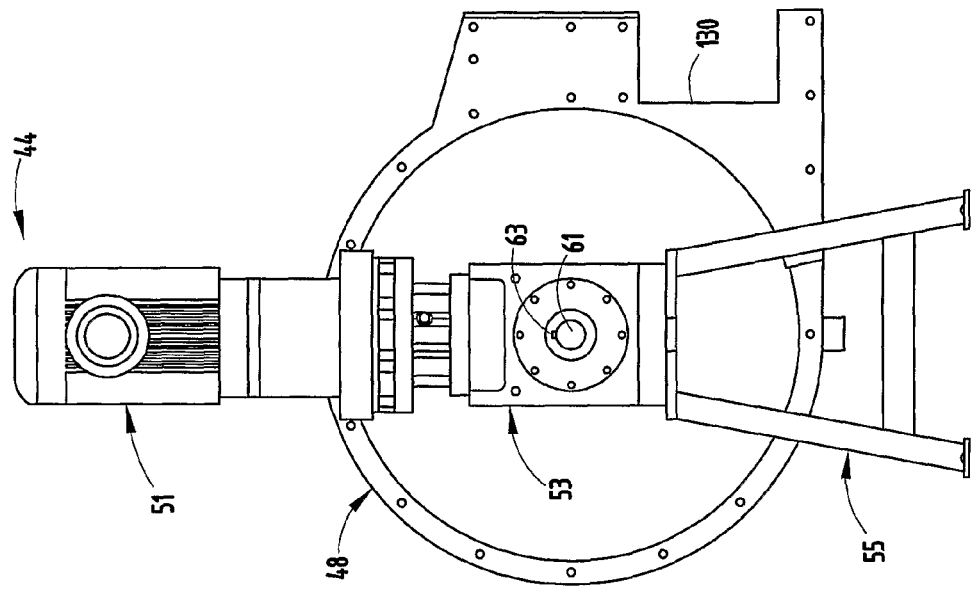
FIG. 9 is side view of the inner housing shell of the liquid extraction assembly and the motor assembly of the liquid extraction system of the present invention.
Figure 8:
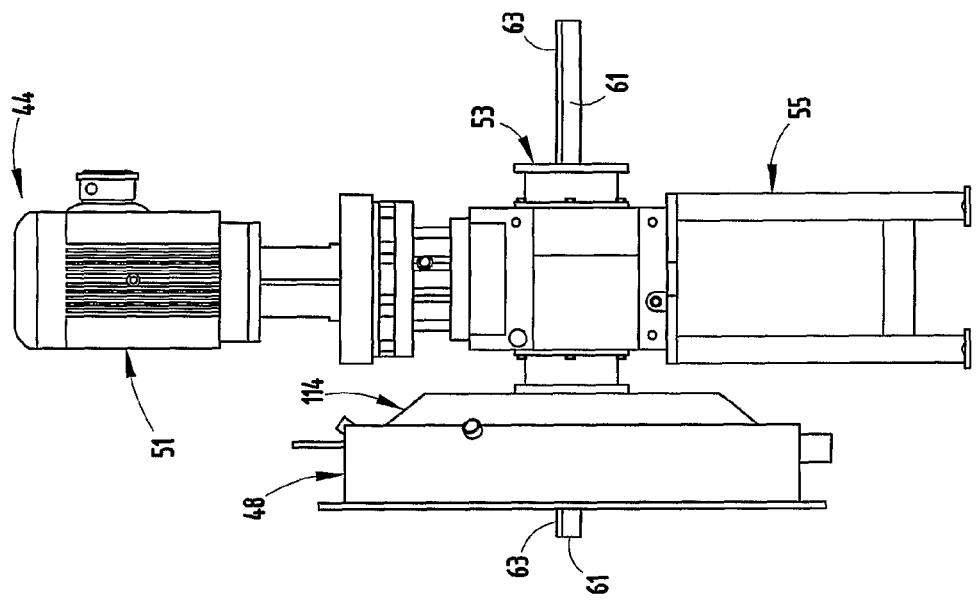
FIG. 8 is a rear view of an inner housing shell of the liquid extraction assembly and the motor assembly of the liquid extraction system of the present invention.

The illustrated liquid extraction assembly 40 is assembled by connecting the liquid extraction presses 11 to the motor assembly 44. In the discussion below, only the connection of one liquid extraction press 11 to the motor assembly 44 will be described. However, any remaining liquid extraction presses 11 can be connected to the motor assembly 44 in a similar manner. In connecting the liquid extraction press 11 to the motor assembly 44, the first step is to connect the inner housing shell 48 to the motor assembly 44 as illustrated in FIGS. 8 and 9. The inner housing shell 48 is connected to the motor assembly 44 by first placing an annular cap 114 (see FIGS. 6 and 6A) over the second end 59 of the motor assembly output shaft 57 and connecting the annular cap 114 to the transfer housing 53 of the motor assembly 44. The second end 59 of the motor assembly output shaft 57 is then inserted through the drive shaft opening 50 of the inner housing shell

48. The inner housing shell 48 is then connected to the motor assembly 44 by inserting fasteners 116 through the fastener openings 58 in the base wall 52 of the inner housing shell 48 and into the annular cap 114 (which is connected to the transfer housing 53). As illustrated in FIGS. 6 and 6A, a seal 118 is located between the motor assembly output shaft 57 and the drive shaft opening 50 of the inner housing shell 48.

After the inner housing shell 48 has been connected to the motor assembly 44, the first side drive wheel 202 of the rotary screen assembly 200 is slid onto the second end 59 of the motor assembly output shaft 57. The first side drive wheel 202 is slid onto the motor assembly output shaft 57 by inserting the second end 59 of the motor assembly output shaft 57 into the drive shaft opening 235 of the inner annular plate 218 and the tubular drive shaft member 220 of the first side drive wheel 202, with the key flange 63 of the second end 59 of the motor assembly output shaft 57 being inserted into the drive shaft notch 237 of the drive shaft opening 235 as discussed above. Thereafter, the center hub/spacer 206 is placed around circular extension member 229 of the inner rim assembly 216 of the first side drive wheel 202. The first side slotted filter screen 204 is then placed over the center hub/spacer 206 by inserting the center hub/spacer 206 within an opening 120 defined by the inner hub 230 of the first side slotted filter screen 204. Once the first side slotted filter screen 204 is fully slid over the center hub/spacer 206, the first side slotted filter screen 204 will abut against the inner edges 215 of the spokes 214 of the first side drive wheel 202 and be located between the inner periphery notch 213 of the first side drive wheel 202 and the center hub/spacer 206. When the first side drive wheel 202 and the first side slotted filter screen 204 are fully connected to the motor assembly output shaft 57 as described directly above, the first side drive wheel 202 and the first side slotted filter screen 204 will be located within the inner housing shell 48.

Figure 18:
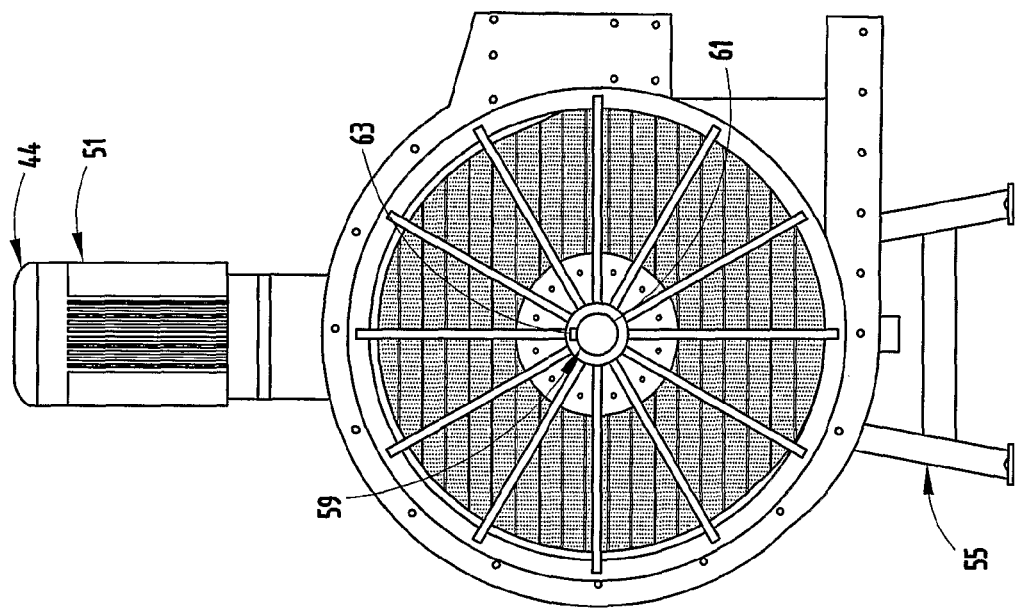
FIG. 18 is a side view of the motor assembly, the inner housing shell, the rotary screen assembly, the drive shaft, and the center seal of the liquid extraction assembly of the present invention.
Figure 17:
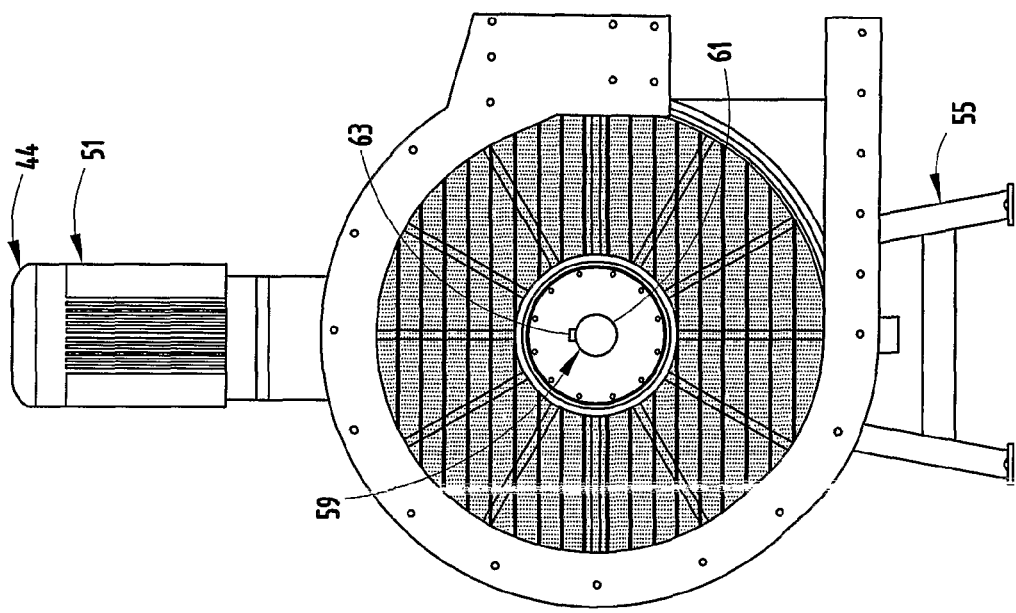
FIG. 17 is a side view of the motor assembly, the inner housing shell, the slotted filter screen, the drive wheel, the drive shaft and the center seal of the liquid extraction assembly of the present invention.

After the first side drive wheel 202, the first side slotted filter screen 204 and the center hub/spacer 206 are assembled as described directly above, the center seal 76 is positioned against the peripheral flange 56 of the inner housing shell 48 as shown in FIG. 17. The center seal 76 is positioned such that the connection openings 122 of the center seal 76 are aligned with the connection openings 74 of the inner housing shell 48. Furthermore, the outside surface of the center hub/spacer 206 will abut the inner annular face 98 of the scraper portion 84 of the center seal 76 as illustrated in FIG. 12. Thereafter, the second side slotted filter screen 208 is slid onto the center hub/spacer 206 by inserting the center hub/spacer 206 within an opening 120 defined by the inner hub 230 of the second side slotted filter screen 208. The second side filter screen 208 is then connected to the liquid extraction press 11 by inserting the second end 59 of the motor assembly output shaft 57 through the drive shaft opening 235 of the inner annular plate 218 and the tubular drive shaft member 220 of the second side drive wheel 210, with the key flange 63 of the second end 59 of the motor assembly output shaft 57 being inserted into the drive shaft notch 237 of the drive shaft opening 235 as discussed above. Furthermore, the circular extension member 229 is inserted into the center hub/spacer 206 and the second side slotted filter screen 208 will abut against the inner edges 215 of the spokes 214 of the second side drive wheel 210 and be located between the inner periphery notch 213 of the second side drive wheel 210 and the center hub/spacer 206. Additionally, a plurality of fasteners 124 are inserted through openings in the inner rim assemblies 216 of the first side drive wheel 202 and the second side drive wheel 210 as illustrated in FIGS. 6 and 6A to assembly the rotary screen assembly 200. The assembly of the liquid extraction press 11 up to this point is illustrated in FIG. 18. Finally, the outer housing shell 46 is abutted against the center seal 76 and the connection openings 74' of the outer housing shell 46 are aligned with the connection openings 122 in the center seal 76 and the connection openings 74 in the inner housing shell 48, and fasteners 126 are inserted through the connection openings 74, 74' and 122 to connect the inner housing shell 48, the center seal 76 and the outer housing shell 46. While a particular assembly procedure has been outlined above, it is contemplated that the liquid extraction assembly 40 could be assembled in any manner. For example, the rotary screen assembly 200 can be assembled as a unitary piece before being connected to the housing 42 of the liquid extraction assembly 40. Furthermore, it is contemplated that the liquid extraction assembly 40 could include a T-shaped seal 45 located between the outer housing shell 46 and the second side drive wheel 210 and between the inner housing shell 48 and the first side drive wheel 202 as illustrated in FIGS. 5-6A, with the T-shaped seals 45 being wedged between the center seal 76, the tubular wall 54, the first side drive wheel 202 and a stop 49 extending from the tubular wall 54 on one side and between the center seal 76, the tubular wall 54', the second side drive wheel 210 and a stop 49 extending from the tubular wall 54 on the other side.

Figure 19B:
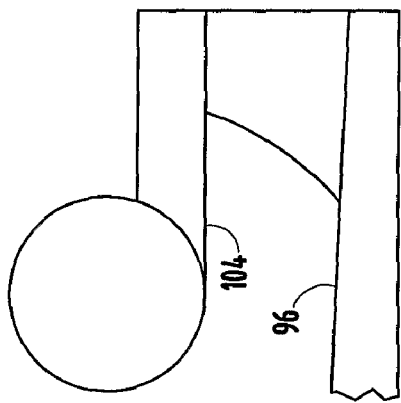
FIG. 19B is a side cross-sectional view of the exit of the liquid extraction assembly of the present invention.
Figure 19C:
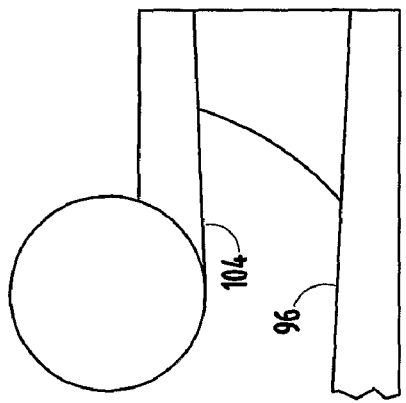
FIG. 19C is a side cross-sectional view of the exit of the liquid extraction assembly of a second embodiment of the present invention.
Figure 19A:
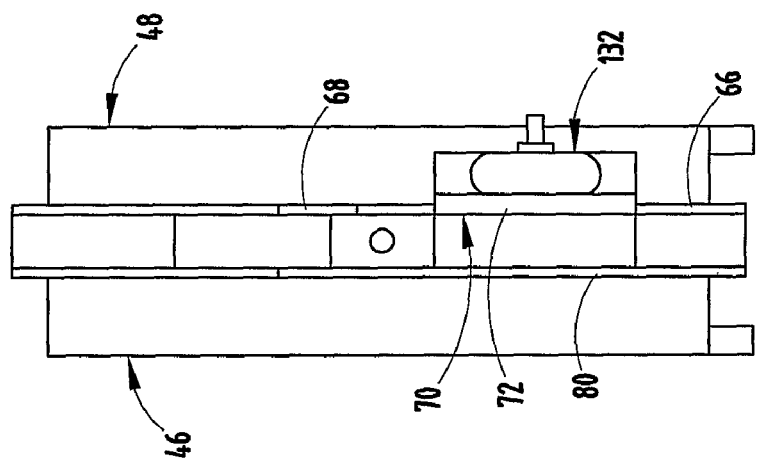
FIG. 19A is an end view of the exit of the liquid extraction assembly of the present invention in a second position.
Figure 19:
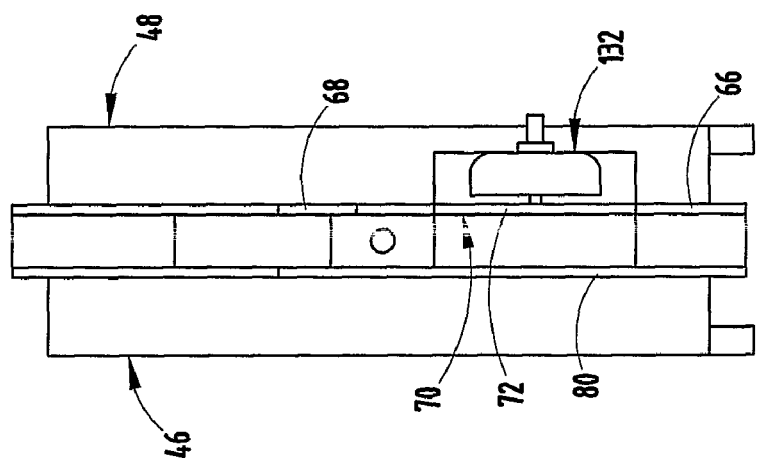
FIG. 19 is an end view of an exit of the liquid extraction assembly of the present invention in a first position.

Once the liquid extraction press 11 is assembled as described above, the mass will have a path through the liquid extraction press 11 defined by the center seal 76, the first side slotted filter screen 204, the second side slotted filter screen 208, the center spacer/hub 206, the extension 80 of the outer housing shell 46 and the side wall 72. As shown in FIGS. 19 and 19A, the side wall 72 is located within the open mouth 70 defined by the bottom extending lip portion 66 and the nose portion 68 of the inner housing shell 48. The side wall 72 is hinged at 134 to a rear portion 130 of the open mouth 70 (see FIGS. 1 and 9-11). The side wall 72 has an air bellows 132 connected to an outer face thereof to rotate the side wall 72 about the hinge 134. In a fully closed position as shown in FIG. 19, the side wall 72 is substantially parallel to the extension 80 of the outer housing shell 46. However, the air bellows 132 can be activated to rotate the side wall 72 about the hinge 134 to widen the exit of the liquid extraction press 11 as shown in FIG. 19A. Therefore, the mass enters into the liquid extraction press 11 through a liquid extraction assembly inlet defined by the inlet extension 90, the first inlet plate 86, the second inlet plate 88 and the top face 102 of the scraper portion 84 of the center seal 76. The mass then moves towards a rear of the center seal 76 and around the center hub/spacer 206 in a path defined by the inner surface of the outer C-shaped portion 82 of the center seal 76, first side slotted filter screen 204, the second side slotted filter screen 208 and the center spacer/hub 206. Finally, the mass exits the liquid extraction assembly through a liquid extraction assembly exit defined by the bottom face 104 of the scraper portion 84 of the center seal 76, the angled top surface 96 of the outlet extension 92, the extension 80 of the outer housing shell 46 and the side wall 72.

In use, the mass enters the liquid extraction assembly 40 through the inlet and is forced around the center hub/spacer 206. While the center seal 76 and the housing 42 are fixed in position, the rotary screen assembly 200 will rotate with the motor assembly output shaft 57 as described above. The pressure of the mass in the piping 22 will force the sludge through the liquid extraction assembly 40 towards the outlet of the liquid extraction assembly. However, as the sludge is moving through liquid extraction assembly 40, the slotted filter screens 204, 208 on either side of the mass will remove the liquid portion from the sludge as described in U.S. Pat. No. 4,534,868. As the slotted filter screens 204, 208 remove the liquid portion from the sludge, the liquid falls down through a pair of areas 180 (see FIG. 6A) between the rotary screen assembly 200 and each of the inner housing shell 48 and the outer housing shell 46. The liquid then exits the housing 42 through the filtrate drains 62. Furthermore, as illustrated in FIG. 2, the filtrate drains 62 can be connected to a liquid exit tube 190 adapted to be connected to a further liquid exit element for disposing of the liquid. Therefore, the liquid portion will flow through the slotted filter screens 204, 208 and down through the filtrate drains 62, 62' of the outer housing shell 46 and the inner housing shell 48, respectively. As the mass moves in the circular path within the liquid extraction assembly 40, the scraping tip 100 of the scraping portion 84 of the center seal 76 will scrape the mass off of the center hub/spacer 206 and move the mass to the outlet of the liquid extraction assembly 40. As the mass moves towards the outlet of the liquid extraction assembly 40, the mass will mostly (if not almost all or all) comprise the solid portion of the sludge to form the cake. Since the mass cake discharge zone tapered outward as described above, rather than straight, the sludge cake can be better controlled and bridging and/or binding of the sludge cake will be reduced.

In the illustrated example, the liquid extraction assembly 40 includes several features for cleaning the interior of the liquid extraction presses 11, the first side slotted filter screen 204 and the second side slotted filter screen 208. First, the scraper portion 84 of the center seal 76 includes a plurality of inlet scrapers 140 (see FIG. 12) extending upward from the side faces 106 of the scraper portion 84. The inlet scrapers 140 abut against the inside faces of the first side slotted filter screen 204 and the second side slotted filter screen 208 as the first side slotted filter screen 204 and the second side slotted filter screen 208 rotate past the inlet scrapers 140, thereby scraping the inside faces of the first side slotted filter screen 204 and the second side slotted filter screen 208 as they rotate past the inlet scrapers 140. Second, the scraper portion 84 of the center seal 76 includes a plurality of cake scrapers 142 (see FIG. 12) extending outward from the side faces 106 of the scraper portion 84. The cake scrapers 142 abut against the inside faces of the first side slotted filter screen 204 and the second side slotted filter screen 208 as the first side slotted filter screen 204 and the second side slotted filter screen 208 rotate past the inlet scrapers 140, thereby scraping the inside faces of the first side slotted filter screen 204 and the second side slotted filter screen 208 as they rotate past the scraper portion 84 of the center seal 76. Third, the scraper portion 84 of the center seal 76 includes a pair of wash nozzles 144 in the side faces 106 of the scraper portion 84. The scraper portion 84 includes a bore 146 through the scraper portion 84, with a washer fluid inlet 148 in the end face 108 of the scraper portion 84 (see FIG. 13). As illustrated in FIGS. 2 and 3, water entering the water supply 29 can also be directed to the washer fluid inlet 148 in the scraper portion 84 and then into the bore 146. The water is then ejected out of the bore 146 through the wash nozzles 144 in the side faces 106 of the scraper portion 84, thereby cleaning the first side slotted filter screen 204 and the second side slotted filter screen 208 as they rotate past the scraper portion 84. It is therefore contemplated that the nozzles 144 can wash and clean the first side slotted filter screen 204 and the second side slotted filter screen 208 during use of the system 10 (i.e., while the mass is deliquefied). Finally, the entire liquid extraction assembly can be cleaned by injecting water or a cleaning fluid into the inner housing shell 48 and the outer housing shell 46 through the sanitary holes 60', 60, respectively, as described above.

Figure 19E:
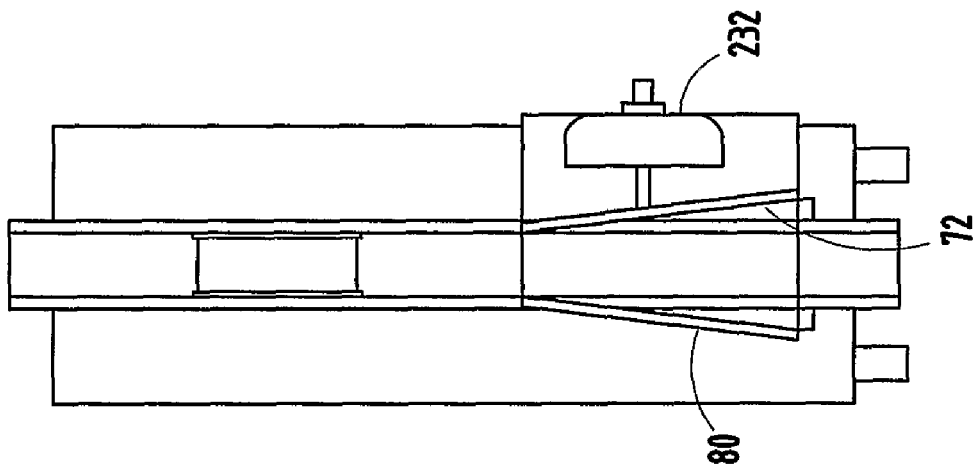
FIG. 19E is an end view of the exit of the liquid extraction assembly of a fourth embodiment of the present invention.
Figure 19D:
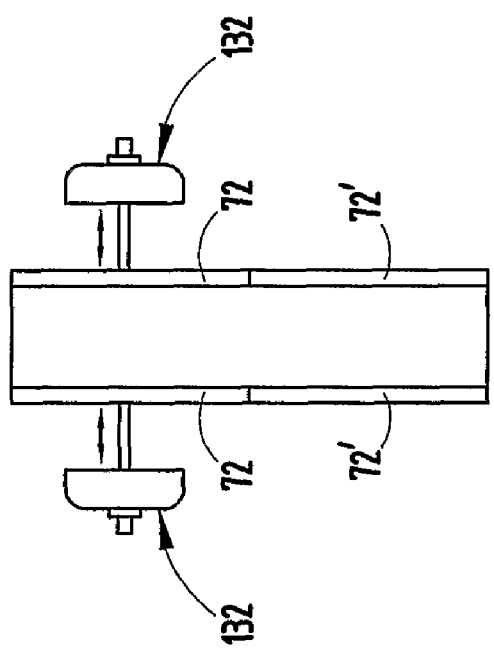
FIG. 19D is an end view of the exit of the liquid extraction assembly of a third embodiment of the present invention.

In the illustrated embodiment, the outlet of the liquid extraction presses 11 includes a top wall defined by the bottom face 104 of the scraper portion 84 of the center seal 76, a bottom wall defined by the angled top surface 96 of the outlet extension 92 of the center seal, a first side wall defined by the extension 80 of the outer housing shell 46 and a second side wall defined by the side wall 72. In the illustrated example, the outlet tapers outwardly because the top wall of the outlet is horizontal and the bottom wall tapers outwardly as described above such that the mass passes from a smaller area to a larger area as the mass passes through the outlet (see FIG. 19B). Furthermore, the side walls can either be parallel or have the side wall 72 taper outwardly as described above. Such an arrangement is illustrated in FIG. 19B. However, it is contemplated that the top wall, the bottom wall, the first side wall and/or the second side wall of the outlet can taper outwardly. For example, as illustrated in FIG. 19C, the bottom face 104 of the scraper portion 84 of the center seal 76 can taper outwardly, thereby providing the outlet with a top and bottom outwardly tapering wall. Furthermore, it is contemplated that the bottom wall of the outlet could be horizontal and the top wall could taper outwardly by having the bottom face 104 of the scraper portion 84 of the center seal 76 taper outwardly. Moreover, it is contemplated that both side walls of the outlet can have the side wall 72 as discussed above (with the outer housing shell 46 including the open mouth 70 and a second side wall 72 therein) such that both of the side walls of the outlet can be selectively moved to taper outwardly. Additionally, it is contemplated that the side wall 72 could only comprise a portion of the side wall of the outlet, with a stationary side wall 72' being located under or over the movable side wall 72 as illustrated in FIG. 19D. Furthermore, it is contemplated that both the side walls of the outlet could taper outwards in a direction from the top wall of the outlet to the bottom wall of the outlet as shown in FIG. 19E such that the distance between the side walls of the outlet is smaller at the top than the bottom of the side walls.

Figure 20:
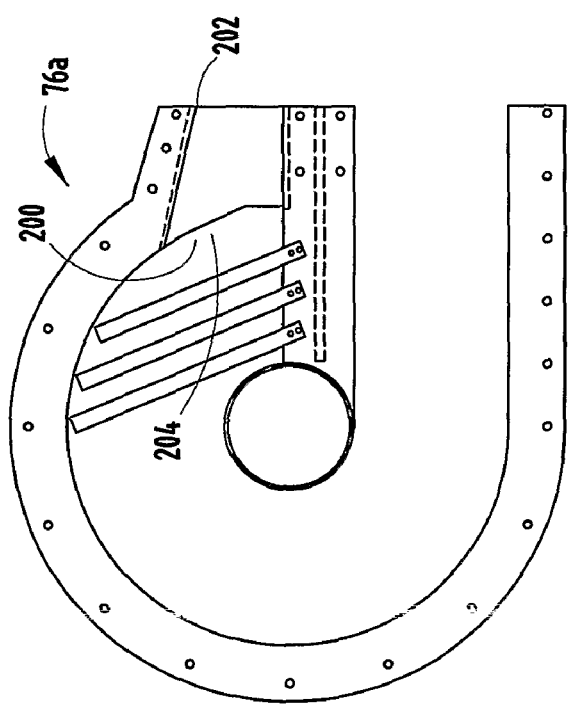
FIG. 20 is a side view of a second embodiment of the center seal of the present invention.

The reference numeral 76a (FIG. 20) generally designates another embodiment of the present invention, having a second embodiment for the center seal. Since center seal 76a is similar to the previously described center seal 76, similar parts appearing in FIGS. 12-13 and FIG. 20, respectively, are represented by the same, corresponding reference number, except for the suffix "a" in the numerals of the latter. The center seal 76a includes an inwardly tapering inlet. The inlet of the housing 18a and the center seal 76a tapers outwardly towards a rear 200 of the inlet such that a beginning 202 of the inlet is smaller than an end 204 of the inlet. A top of the first inlet plate 86a, the second inlet plate 88a, and the pair of grooves 94a of the inlet extension 90a will also taper outwardly towards the end 204 of the inlet. Therefore, in the second embodiment of the center seal 76a, the pressure of the mass entering the housing 18a will decrease as the mass enters the inlet. The remainder of the center seal 76a and the housing 18a can be identical to any of the center seals and housings described above.

Figure 21:
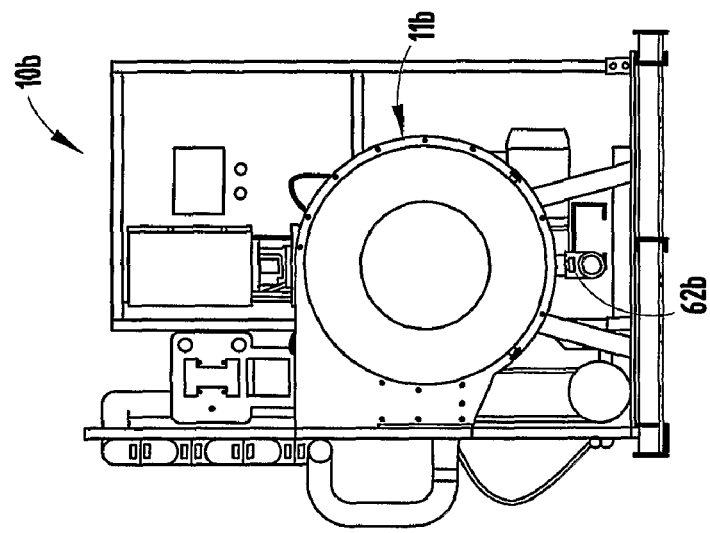
FIG. 21 is a side view of a second embodiment of the system for extracting liquid from a mass of the present invention.

The reference numeral 10b (FIG. 21) generally designates another embodiment of the present invention, having a second embodiment for the system for extracting liquid from a mass. Since the system 10b is similar to the previously described system 10, similar parts appearing in FIGS. 1-19 and FIG. 21, respectively, are represented by the same, corresponding reference number, except for the suffix "b" in the numerals of the latter. In the second embodiment of the system 10b, the liquid extraction presses 11b and everything therein is orientated upside-down, such that the inlet to the liquid extraction press 11b is located below the outlet of the liquid extraction press 11b and the mass will move upwardly through the liquid extraction press 11b. However, the filtrate drain 62*b* will continue to be located at a bottom of the liquid extraction presses 11*b*, such that liquid will continue to be able to be drained out of the liquid extraction presses 11*b*. Furthermore, the sanitary holes 60*b* would continue to be located at a top of the liquid extraction presses 11*b*.

It is to be understood that variations and modifications can be made on the aforementioned structure without departing from the concepts of the present invention, and further it is to be understood that such concepts are intended to be covered by the following claims unless these claims by their language expressly state otherwise.

I claim:

1. A liquid extraction assembly for extracting liquid from a mass comprising:
   a housing having an inlet and an outlet;
   the housing further including a path between the inlet and the outlet;
   the housing being configured to have the mass forced into the inlet to move the mass from the inlet to the outlet;
   the housing including at least one rotating screen adjacent the path and defining one wall of the path;
   the at least one rotating screen including a plurality of openings therethrough; and
   the inlet of the housing tapering outwardly towards a rear of the inlet such that a beginning of the inlet is smaller than an end of the inlet;
   wherein pressure from the mass forced into the inlet presses the mass against the at least one rotating screen to thereby force at least a portion of liquid in the mass to pass through the openings of the at least one rotating screen;
   wherein the mass that moves from the inlet to the outlet does not pass through the at least one rotating screen;
   wherein the at least one rotating screen comprises two rotating screens; and
   wherein the inlet tapers up to a point that the inlet intersects the rotating screens.

2. The liquid extraction assembly of claim 1, wherein:
   the plurality of openings comprises a plurality of parallel elongated slots.

3. The liquid extraction assembly of claim 1, wherein:
   the outlet includes at least one pair of oppositely facing side walls being fixedly tapered away from each other.

4. The liquid extraction assembly of claim 1, wherein:
   the housing including a washing fluid inlet communicating with an exterior of the housing, the washing fluid inlet having at least one nozzle for spraying washing fluid against the rotating screens to clean the rotating screens.

5. The liquid extraction assembly of claim 4, wherein:
   the at least one nozzle comprises two nozzles, each nozzle spraying one of the rotating screens.

6. The liquid extraction assembly of claim 1, wherein:
   the path is substantially circular; and
   the two rotating screens define opposite walls of the path.

7. The liquid extraction assembly of claim 1, wherein:
   the housing includes at least one fixed scraper in the path and adjacent the rotating screens, the at least one fixed scraper cleaning the at least one of the rotating screens as the rotating screens are rotated past the at least one fixed scraper.

8. The liquid extraction assembly of claim 1, wherein:
   the outlet includes at least one pair of oppositely facing fixed walls, the at least one pair of oppositely facing fixed walls tapering away from each other such that the mass passes from a smaller area to a larger area as the mass passes through the outlet.

9. The liquid extraction assembly of claim 1, wherein:
   the outlet includes a first end, a second end, a top, a bottom, a first side wall and a second side wall;
   the mass enters the outlet at the first end and exits the outlet at the second end;
   the first side wall and the second side wall taper outwards in a direction from the top to the bottom such that the distance between the first side wall and the second side wall is smaller at the top than at the bottom.

10. The liquid extraction assembly of claim 9, wherein:
    the top and the bottom are fixed and taper away from each other such that the first end of the outlet is smaller than the second end of the outlet.

11. The liquid extraction assembly of claim 1, further including:
    a motor for rotating the rotating screens.

12. The liquid extraction assembly of claim 1, further including:
    a shaft assembly extending from the motor to the rotating screens;
    the shaft assembly having a right angled portion.

13. The liquid extraction assembly for extracting liquid from a mass of claim 1, wherein:
    the rotating screens are disc-shaped.

14. A liquid extraction assembly for extracting liquid from a mass comprising:
    a pair of housings, each having an inlet and an outlet;
    the housings each further including a path between the inlet and the outlet;
    the housings being configured to have the mass forced into the inlet to move the mass from the inlet to the outlet;
    the housings each including at least one rotating screen adjacent the path and defining one wall of the path;
    the rotating screens including a plurality of openings therethrough;
    the inlet of each housing tapering outwardly towards a rear of the inlet such that a beginning of the inlet is smaller than an end of the inlet; and
    a single motor positioned between the pair of housings for driving both of the rotating screens;
    wherein pressure from the mass forced into the inlet presses the mass against the rotating screens to thereby force at least a portion of liquid in the mass to pass through the openings of the rotating screens.

15. The liquid extraction assembly of claim 14, wherein:
    the plurality of openings comprises a plurality of parallel elongated slots.

16. The liquid extraction assembly of claim 14, wherein:
    the outlet includes at least one pair of oppositely facing side walls being fixedly tapered away from each other.

17. The liquid extraction assembly of claim 16, wherein:
    the outlet includes a first end, a second end, a first side wall and a second side wall;
    the pair of oppositely facing side walls comprise a top wall and a bottom wall;
    the mass enters the outlet at the first end and exits the outlet at the second end;
    the first side wall and the second side wall taper outwards in a direction from the top wall to the bottom wall such that the distance between the first side wall and the second side wall is smaller at the top wall than at the bottom wall.

18. The liquid extraction assembly of claim 17, wherein:
    at least a portion of the first side wall is rotatably connected in the housing at the first end of the outlet at a pivot point whereby the at least a portion of the first side wall can rotate outwardly to enlarge the second end of the outlet.

19. The liquid extraction assembly of claim 14, wherein:
the housing including a washing fluid inlet communicating with an exterior of the housing, the washing fluid inlet having at least one nozzle for spraying washing fluid against the at least one rotating screen to clean the at least one rotating screen.

20. The liquid extraction assembly of claim 19, wherein:
the at least one nozzle comprises two nozzles, each nozzle spraying one of the rotating screens.

21. The liquid extraction assembly of claim 14, wherein:
the at least one rotating screen comprises two rotating screens.

22. The liquid extraction assembly of claim 21, wherein:
the path is substantially circular; and
the two rotating screens define opposite walls of the path.

23. The liquid extraction assembly of claim 14, wherein:
the housing includes at least one fixed scraper in the path and adjacent the at least one rotating screen, the at least one fixed scraper cleaning the at least one rotating screen as the rotating screen is rotated past the at least one fixed scraper.

24. The liquid extraction assembly of claim 14, wherein:
the outlet includes at least one pair of oppositely facing fixed walls, the at least one pair of oppositely facing fixed walls tapering away from each other such that the mass passes from a smaller area to a larger area as the mass passes through the outlet.

25. The liquid extraction assembly of claim 14, wherein:
the outlet includes a first end, a second end, a top, a bottom, a first side wall and a second side wall;
the mass enters the outlet at the first end and exits the outlet at the second end;
the first side wall and the second side wall taper outwards in a direction from the top to the bottom such that the distance between the first side wall and the second side wall is smaller at the top than at the bottom.

26. The liquid extraction assembly of claim 25, wherein:
the top and the bottom are fixed and taper away from each other such that the first end of the outlet is smaller than the second end of the outlet.

27. The liquid extraction assembly of claim 25, wherein:
at least a portion of the first side wall is rotatably connected in the housing at the first end of the outlet at a pivot point whereby the at least a portion of the first side wall can rotate outwardly to enlarge the second end of the outlet.

28. The liquid extraction assembly of claim 14, further including:
a shaft assembly extending from the motor to the at least one rotating screen;
the shaft assembly having a right angled portion.

29. A liquid extraction assembly for extracting liquid from a mass comprising:
a housing having an inlet and an outlet;
the housing further including a path between the inlet and the outlet;
the housing being configured to have the mass forced into the inlet to move the mass from the inlet to the outlet;
the housing including at least one rotating screen adjacent the path and defining one wall of the path;
the at least one rotating screen including a plurality of openings therethrough; and
the inlet of the housing tapering outwardly towards a rear of the inlet such that a beginning of the inlet is smaller than an end of the inlet;
wherein pressure from the mass forced into the inlet presses the mass against the at least one rotating screen to thereby force at least a portion of liquid in the mass to pass through the openings of the at least one rotating screen;
wherein the mass that moves from the inlet to the outlet does not pass through the at least one rotating screen;
wherein the outlet includes at least one pair of oppositely facing side walls being fixedly tapered away from each other;
wherein the outlet includes a first end, a second end, a first side wall and a second side wall;
wherein the pair of oppositely facing side walls comprise a top wall and a bottom wall;
wherein the mass enters the outlet at the first end and exits the outlet at the second end; and
wherein the first side wall and the second side wall taper outwards in a direction from the top wall to the bottom wall such that the distance between the first side wall and the second side wall is smaller at the top wall than at the bottom wall.

30. The liquid extraction assembly of claim 29, wherein:
at least a portion of the first side wall is rotatably connected in the housing at the first end of the outlet at a pivot point whereby the at least a portion of the first side wall can rotate outwardly to enlarge the second end of the outlet.

31. A liquid extraction assembly for extracting liquid from a mass comprising:
a housing having an inlet and an outlet;
the housing further including a path between the inlet and the outlet;
the housing being configured to have the mass forced into the inlet to move the mass from the inlet to the outlet;
the housing including at least one rotating screen adjacent the path and defining one wall of the path;
the at least one rotating screen including a plurality of openings therethrough; and
the inlet of the housing tapering outwardly towards a rear of the inlet such that a beginning of the inlet is smaller than an end of the inlet;
wherein pressure from the mass forced into the inlet presses the mass against the at least one rotating screen to thereby force at least a portion of liquid in the mass to pass through the openings of the at least one rotating screen;
wherein the mass that moves from the inlet to the outlet does not pass through the at least one rotating screen;
wherein the outlet includes a first end, a second end, a top, a bottom, a first side wall and a second side wall;
wherein the mass enters the outlet at the first end and exits the outlet at the second end;
wherein the first side wall and the second side wall taper outwards in a direction from the top to the bottom such that the distance between the first side wall and the second side wall is smaller at the top than at the bottom; and
wherein at least a portion of the first side wall is rotatably connected in the housing at the first end of the outlet at a pivot point whereby the at least a portion of the first side wall can rotate outwardly to enlarge the second end of the outlet.

32. A system for extracting liquid from a mass comprising:
a portable platform having an upper surface;
a system mass input;
a polymer feeding and blending system on the upper surface;
a liquid extraction assembly on the upper surface, the liquid extraction assembly including an inlet and an outlet; and piping having a first section between the system mass input and the polymer feeding and blending system, and a second section between the polymer feeding and blending system and the liquid extraction assembly;

wherein the system is configured to have mass inputted into the system mass input, transport the mass to the polymer feeding and blending system through the first section of the piping, inject polymer into the mass in the polymer feeding and blending system, transport the mass from the polymer feeding and blending system to the inlet of the liquid extraction assembly;

wherein pressure from mass forced into the liquid extraction assembly forces at least a portion of liquid in the mass to exit the mass, whereby the mass with the portion of liquid removed therefrom is exited out of the outlet of the liquid extraction assembly; and wherein the inlet to the liquid extraction assembly is located below the outlet of the liquid extraction assembly.

33. The system for extracting liquid from a mass of claim 32, wherein:
the upper surface of the portable platform is less than 72 square feet.

34. The system for extracting liquid from a mass of claim 32, wherein:
the liquid extraction assembly comprises at least one housing having the inlet and the outlet;
the at least one housing further including a path between the inlet and the outlet;
the at least housing being configured to have the mass forced into the inlet to move the mass from the inlet to the outlet;
the at least one housing including at least one rotating screen adjacent the path and defining one wall of the path;
the at least one rotating screen including a plurality of openings therethrough;
wherein pressure from mass forced into the inlet presses the mass against the at least one rotating screen to thereby force at least a portion of liquid in the mass to pass through the openings of the at least one rotating screen.

35. The system for extracting liquid from a mass of claim 34, wherein:
the at least one housing comprises two housings.

36. The system for extracting liquid from a mass of claim 35, wherein:
a single motor is positioned between the housings for driving both of the rotating screens.

37. The system for extracting liquid from a mass of claim 36, further including:
a shaft assembly extending from the motor to the rotating screens;
the shaft assembly having a pair of right angled portions.

38. The system for extracting liquid from a mass of claim 34, wherein:
the inlet of the housing tapers outwardly towards a rear of the inlet such that a beginning of the inlet is smaller than an end of the inlet.

39. A liquid extraction assembly for extracting liquid from a mass comprising:
a housing having an inlet and an outlet; and
a support supporting the housing and located below the housing;
the housing further including a path between the inlet and the outlet;
the housing being configured to have the mass forced into the inlet to move the mass from the inlet to the outlet;
the housing including a plurality of rotating screens adjacent the path and defining one wall of the path;
the rotating screens including a plurality of openings therethrough; and
wherein pressure from the mass forced into the inlet presses the mass against the rotating screens to thereby force at least a portion of liquid in the mass to pass through the openings of the rotating screens;
wherein the inlet to the liquid extraction assembly is located below the outlet of the liquid extraction assembly; and
wherein the mass that moves from the inlet to the outlet does not pass through the rotating screens.

40. A liquid extraction assembly for extracting liquid from a mass comprising:
a housing having an inlet and an outlet; and
a support supporting the housing and located below the housing;
the housing further including a path between the inlet and the outlet;
the housing being configured to have the mass forced into the inlet to move the mass from the inlet to the outlet;
the housing including at least one disc-shaped rotating screen adjacent the path and defining one wall of the path;
the at least one disc-shaped rotating screen including a plurality of openings therethrough; and
wherein pressure from the mass forced into the inlet presses the mass against the at least one disc-shaped rotating screen to thereby force at least a portion of liquid in the mass to pass through the openings of the at least one disc-shaped rotating screen;
wherein the inlet to the liquid extraction assembly is located below the outlet of the liquid extraction assembly; and
wherein the mass that moves from the inlet to the outlet does not pass through the at least one disc-shaped rotating screen.

41. The liquid extraction assembly for extracting liquid from a mass of claim 40, wherein:
the at least one disc-shaped rotating screen comprises a plurality of disc-shaped rotating screens.

* * * * *